United States Patent [19]
Woltman et al.

[11] Patent Number: 5,098,585
[45] Date of Patent: Mar. 24, 1992

[54] AQUARIUM FILTER ASSEMBLY

[75] Inventors: Klaus Woltman, Demarest; Allan H. Willinger, Franklin Lakes, both of N.J.

[73] Assignee: Willinger Bros., Inc., Oakland, N.J.

[21] Appl. No.: 709,657

[22] Filed: Jun. 3, 1991

[51] Int. Cl.$^5$ ............................................. A01K 63/04
[52] U.S. Cl. .................... 210/778; 210/806;
210/117; 210/123; 210/128; 210/169; 210/193;
210/416.2; 210/420; 119/5
[58] Field of Search ............... 210/109, 117, 123, 128,
210/169, 193, 196, 416.2, 419, 420, 456, 778,
805; 119/4, 5

[56] References Cited

U.S. PATENT DOCUMENTS

| | | | |
|---|---|---|---|
| 4,036,756 | 7/1977 | Dockery | 210/169 |
| 4,490,250 | 12/1984 | Dockery | 210/169 |
| 4,761,227 | 8/1988 | Willinger et al. | 210/169 |
| 4,842,727 | 6/1989 | Willinger et al. | 210/169 |
| 4,915,828 | 4/1990 | Meyers et al. | 210/169 |
| 5,062,950 | 11/1991 | Shieh | 210/169 |

Primary Examiner—Peter Hruskoci
Assistant Examiner—Robert James Popovics
Attorney, Agent, or Firm—Helfgott & Karas

[57] ABSTRACT

An aquarium filter assembly which can be utilized as a diatomaceous earth filter which is self-priming. The filter includes a housing having a pump means from which depends a filtering element. The water pumped through the filtering element can be directed either back into the housing for recirculation of the water in the housing, or out of the housing and back into the aquarium tank for filtering of the aquarium tank water. A valve within the housing operates to permit water entry into the housing upon initial insertion and during filtration of the aquarium tank water. The valve closes when the water flow from the filtering element is directed back into the housing. Diatomaceous earth can be added into the housing and the water recirculated within the housing serves to self-prime the filter element. After charging the filter element, the water flow from the filtering element is directed into the aquarium tank and the valve opens to permit regular filtering of the aquarium tank water.

25 Claims, 5 Drawing Sheets

AQUARIUM FILTER ASSEMBLY

This invention relates to aquarium filtration systems, and more particularly to a filter assembly for aquarium tanks.

BACKGROUND OF THE INVENTION

Filtration systems for aquarium tanks typically include filtering elements designed to provide various combinations of mechanical, chemical and biological filtration. These filtering elements are located within the aquarium tank itself or in a separate self-contained filter assembly usually mounted externally on the aquarium tank. Such externally mounted filter assembly has the advantage that it may be easily installed and its filtering elements easily removed, cleaned and replaced without unduly disturbing the fish within the aquarium tank. External filter assemblies suffer from the disadvantage that they require arrangements for priming the filter assembly. Any interruption or break in the water flow, such as may result from the removal and replacement of the filtering elements, can necessitate repriming of the system.

While the typically externally mounted filter assembly has been well developed in the industry, these filters can only provide a limited amount of filtration which satisfies for normal use. Occasionally, extra intense filtering of the aquarium tank is required. By way of example, when the aquarium water becomes cloudy as a result of inadequately washed sand or gravel placed in the tank, extra filtration is required. Similarly, as a result of the presence of a green color from algae in the tank, or as a result of the presence of fine dust particles, the normal external filter would be insufficient to clean the aquarium tank. These fine particles of contamination in the aquarium tank would tend to pass through the normal filtering elements in typical external filtering assemblies.

For such occasional extra filtration, it is typical to use a diatomaceous earth filter. Such filters are well known in the art and utilize a filter bag which must first be coated with the fine particles of diatomaceous earth filtration material. Once the bag is coated o primed with the diatomaceous earth, it can then be utilized in an external aquarium filtration system on a temporary basis for cleaning the aquarium tank of this contamination.

Diatomaceous earth filters have heretofore been known to be extremely clumsy and difficult to utilize. Typically, the filter bag is first primed externally of the filter and then placed into operation. Then a suction is created to cause the aquarium tank water to flow into the diatomaceous earth filter apparatus. By way of example, one such filter is described in U.S. Pat. No. 4,036,756 which requires the formation of a suction by means of a siphon in the diatomaceous earth filter before it can begin operation. Another arrangement of a diatomaceous earth filter is described in U.S. Pat. No. 4,490,250. This one, likewise, is a complex arrangement using a drive belt to drive the pump separate from the container holding the filter element. Additionally, every one of these filters must be hermetically sealed to prevent leakage.

In these, and other prior art systems, in addition to the difficulty in priming the filter bag causing it to be coated with the diatomaceous earth, there is an even greater problem in cleaning the filter. After the tank has been filtered, the diatomaceous earth filter must be turned off, which almost always causes a flow-back of some of the contaminated water from the filter back to the aquarium tank. Thereafter, disconnecting the filter from the tank, again causes a messy, sloppy, and difficult task.

The prior art diatomaceous earth filters are all of the type that stand on the floor or hang outside the aquarium tank and include large motors. They typically use jars, such as mason jars, which in use, must be hermetically sealed, require suction or a siphon to be created in order to operate, and are of the type that is difficult to utilize.

In addition, such diatomaceous earth filters are uniquely designed for that purpose and generally are not utilized for other filtration purposes. Accordingly, it is necessary to have a separate diatomaceous earth filter which must be utilized on an intermittent basis in addition to the separate filtration system used in normal operation.

SUMMARY OF THE INVENTION

Accordingly, it is an object of the present invention to provide a diatomaceous earth filter which can be self-primed to coat the diatomaceous earth on the filter bag, and subsequently, easily utilized for actual filtration.

Another object of the present invention is to provide an aquarium filter assembly for use with fine particle filtering elements and having a simple and effective system for coating a filtering bag with the fine particle filtering elements and for maintaining such coating thereafter.

Still another object of the present invention is to provide an aquarium filtering system which utilizes the benefits of both an internal aquarium filter and an external aquarium filter.

A further object of the present invention is to provide a diatomaceous earth filter having a first position for self-priming the filter through the coating of the filter bag with the diatomaceous earth, and a second position for actual filtration of the aquarium tank.

Yet another object of the present invention is to provide an aquarium filter assembly which can be utilized intermittently as a diatomaceous earth filter and can also be utilized as a regular filter for normal use by interchanging the type of filtering element utilized in the filter assembly.

A still further object of the invention is to provide an aquarium filter assembly having a water circulating system in which the flow rate may be easily regulated and an enhanced aeration of the filtered water may be easily provided.

A still further object of the invention is to provide an aquarium filter assembly in which its fluid pumping, filtering and conduit system is formed as a single integrated unit which is removably supported within the filter assembly. Once the filter assembly is mounted within the aquarium, this integral unit may be easily removed from the assembly in order to permit replacement of the filtering element without disturbing the fish within the aquarium.

In accord with an embodiment of the invention, an aquarium filter assembly is provided having an outer housing adapted to be mounted on a side wall internally of the aquarium tank. Supported within this housing are a filtering element, fluid conduit means and a water pump for circulating the water flow. The fluid conduit means is arranged to direct water received from the aquarium tank and passed through the filtering element to flow out of the conduit selectively either into the filter assembly or out of the filter assembly back into the aquarium tank. A controlled valve is located within the filter assembly to control the flow of water from the aquarium tank into the filter assembly through an inlet in the filter assembly housing.

The valve operates to shut off the entry of water from the aquarium tank into the filter assembly when the filtered water output flow from the fluid conduit is directed internally within the filter assembly, and to permit entry of water from the aquarium tank into the filter assembly when the output flow from the fluid conduit is directed back into the aquarium tank. The valve also permits entry of water from the aquarium tank into the filter assembly whenever the filter assembly is initially immersed within the aquarium while the pump is not energized. It also closes the inlet for removal of the filter assembly for cleaning and disposal.

Thus, the filter assembly can be initially self-primed before it begins operation. The filter is initially internally mounted in the aquarium tank. It is hung from a side wall of the aquarium tank with the bulk of the housing located in the aquarium tank water. The insertion is done with the pump motor turned off. The aquarium tank water will enter into the filter as it is inserted into the tank and will fill the filter with aquarium water to the level of the water in the tank. When the water pump is turned on, the water is pumped in through the filter element. The fluid conduit is arranged to direct that water back into the filter housing. The circulating water internally of the filter housing causes the valve to shut off the entry of further contaminated water from the aquarium tank, and the pumping action forces the water trapped within the filter housing to recirculate though the filtering element within the filter housing.

At this point fine particle filtration material, such as diatomaceous earth, is introduced into the filter assembly housing, for example, by merely being poured thereinto. The forced recirculation of the diatomaceous earth containing water within the filter assembly housing and through its filtering element causes the outer surface of this filtering element to be thoroughly coated with the diatomaceous earth particles. The filter element is typically a filter bag with an internal sponge. It will be appreciated that as long as the water within the filter assembly contains such diatomaceous earth material, any circulation of the water through the filtering element will continue to produce such coating.

Once the filter bag is coated, the fluid conduit means is then turned to direct the water to flow out of the filter assembly back into the aquarium tank while the pump remains on. The valve now permits entry of additional contaminated water from the aquarium tank to flow into the filter assembly. This additional water is pumped through the now-coated filtering element, and a circulation of water from the aquarium tank through the coated filtering element and back into the aquarium tank is thus established and sustained to provide the fine filtration of the aquarium tank water.

At any time thereafter if the filtering element should require recoating, it is only necessary to again direct the output flow from the fluid conduit back into the filter housing in order to close the valve. Additional fine particle filtering material can then be introduced into the water of the filter assembly. Once this recoating is completed, the output flow is then re-directed back into the aquarium tank to reestablish the filtration of the aquarium tank water.

In accord with one embodiment of the invention, the fluid conduit includes an output tube having a portion which extends above the housing of the filter assembly in a horizontal direction parallel to the surface of the water within the filter assembly. This tube is open at one end and has its other end making a swivel connection to a further tube connected to the pump impeller which, in turn, is connected to the filter element. This swivelled output tube may be rotated on its swivel between positions which direct the water flow either back into the filter assembly or outside of the filter assembly and into the aquarium tank. The distal end of the output tube terminates in a substantially downwardly directed discharge end which terminates above the filter housing wall so that the water flow is emitted from the discharge end in a downward direction either back into the filter assembly or into the aquarium tank. The valve is located beneath the output tube so that when the output tube is in the position to recirculating the water, the valve receives the force of the water flowing in the filter to close and prevent further entry of aquarium tank water into the filter housing. It has been found that only a very moderate force of water under pump pressure is sufficient to close the valve and prevent further entry of water from the aquarium tank into the filter assembly.

The housing of the filter assembly may conveniently be a simple open top rectangular container with two of its opposing sides longer than its remaining two opposing sides thereby providing a narrow container no wider than required to accommodate the pump. This filter assembly container is mounted within the aquarium tank by being hung from the top of the aquarium tank wall with on of the containers longer sides against the aquarium wall so that the container presents a narrow appearance not obstructing the fish within the aquarium. The upper end of the filter container extends upward above the water level of the aquarium tank water. The narrowness of the container also enables the horizontally extending portion of the swivelled output tube to be relatively short in length and yet reach outside of the filter assembly when rotated to positions generally transverse to the longer tank sides.

In accord with another feature of the invention, the water pump, fluid conduit, and filtering element can be constructed as an integral assembly removably supported by the filter housing. This can result in a simple and inexpensive construction which may be easily removed from the tank as a unit in order to clean or replace the filtering element whenever needed.

In accord with a further feature of the invention, the water from the discharge end of the outlet tube passes through the air before it is pumped back into the filter assembly or into the aquarium tank, and thus is aerated. This aeration can be enhanced by a water dispersion means at the discharge end. A flow control element can also be included, as for example, at the discharge end to regulate the force and flow rate of the water being circulated. Such water regulation may be desirable to insure closure of the valve and proper coating of the filtering element by increasing the flow rate when the water is recirculated into the filter housing, and to prevent undue disturbance of the fish by reducing the flow rate when the water is emitted into the aquarium tank.

In accord with a still further feature of the invention, the outlet tube may also be rotated to a position transverse to the longer side of the filter assembly housing and opposite to its aquarium tank emitting position, in which latter position the emitted water flows outside of both the filter assembly and the aquarium tank. This provides an easy way to drain water from the aquarium tank and lower the water level within the aquarium tank whenever desired.

The filtering element itself may be a simple filter bag with an internal filtering sponge, the outer surface of the filter bag being coated with diatomaceous earth material. Preferably, in accord with a feature of the invention, this filtering element is adapted to be removably attached to the pump entry nozzle from which it hangs so that other types of filtering elements may be substituted therefor. One such alternative filtering element can be provided which does not require fine particle coating. This alternative filtering element can be a standard type filtering element which can be used for normal filtration of the aquarium tanks.

In accord with one embodiment of the invention, the valve is a flap door hinged on a side wall of the filter housing which can swing inwardly to permit entry of water from the aquarium into the filter housing. During internal recirculation of the water during priming of the filter, the pressure from the discharge end of the fluid conduit retains the flap door closed preventing water from entry into the filter housing. In another embodiment of the invention, the valve can be a flotation valve held within a cage built within the filter housing and can float upwardly to permit entry of aquarium water into the filter housing. During internal recirculation of the water during priming of the filter, the flow of water downward from the discharge end keeps the flotation valve closed preventing further entry of water from the aquarium tank into the filter housing.

BRIEF DESCRIPTION OF THE DRAWINGS

The novel features believed characteristic of the invention are set forth in the appended claims. The invention itself, together with any further objects and advantages thereof, may best be understood by reference to the following description taken in conjunction with the accompanying drawings in which:

DESCRIPTION OF THE PREFERRED EMBODIMENT

Figure 1:
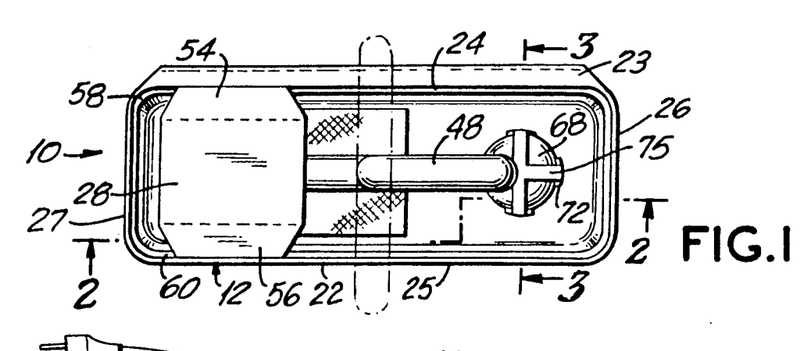
FIG. 1 is a plan view of the filter assembly in accordance with a first embodiment and looking down into the open top thereof.
Figure 2:
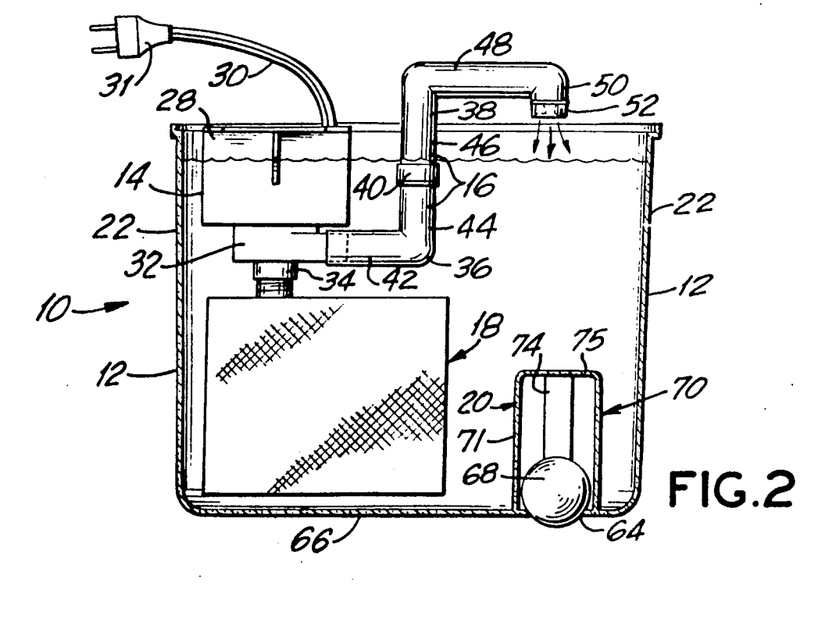
FIG. 2 is a front sectional view of the filter assembly taken along line 2—2 of FIG. 1 with the fluid conduit output tube in position to emit water internally back into the filter assembly.
Figure 3:
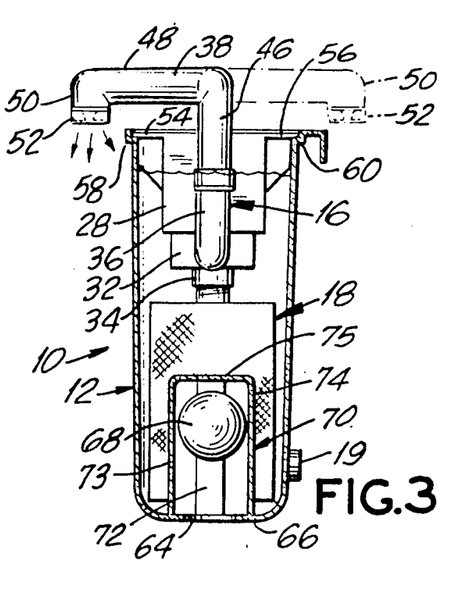
FIG. 3 is a short sectional view of the filter assembly taken along line 3—3 of FIG. 1 with the fluid conduit output tube in position to emit water into the aquarium tank.

Referring to FIGS. 1, 2 and 3, there is shown a filter assembly 10 embodying the invention. Filter assembly 10 includes an outer housing 12, which contains a pump assembly 14, fluid conduit means 16, a filtering element 18 and a flotation valve 20. Housing 12 may, as shown, be a simple open-top container 22 of rectangular cross section which is adapted to be supported by hanging from the top of an aquarium tank wall by a flange 23 of L-shape cross section extending along the top of one longer side 24 of container 22. A finger 19 provides a spacer against the tank wall to keep the filter vertically hung. Container 22 has two opposing longer sides 24, 25 and two opposing shorter sides 26, 27. Pump assembly 14 contains an electric motor 28, an electric cord 30 having a male terminal 31 adapted for connection to an electric power source, and a fluid impeller 32. The fluid impeller 32 is connected both to a pump inlet tube 34 and a pump outlet tube 36 of the fluid conduit means 16. The fluid conduit means 16 also includes a fluid discharge tube 38 which is connected to the pump outlet tube 36 by a swivel connection 40. The swivel connection can be conveniently formed by providing one of the tubes 36 and 38 with a collar and rotatably seating the other of the tubes therein.

The pump outlet tube 36 is L-shaped with one horizontal portion 42 connected to fluid impeller 32 and its other upwardly extending portion 44 terminating in the swivel connection 40 with the fluid discharge tube 38. The fluid discharge tube 38 is U-shaped with its inlet portion 46 extending upwardly from its swivel connection 40 to an intermediate portion 48 extending horizontally well above the open top of container 22. A discharge end portion 50 extends downward a short distance to a point also above the top of container 22. While the inlet portion 46 is shown as being considerably longer than its discharge end portion 50, it will be appreciated that the swivel connection may be located anywhere along the vertical distance between the horizontal portion 42 of the pump outlet tube 36 and the horizontally extending portion 48 of the fluid discharge tube 38. Other swivel arrangements could also be used.

A water flow regulating and dispersing means such as nozzle 52 can also be connected to the discharge end portion 50. Nozzle 52 extends only a short distance so that it also terminates above the top of container 22. Nozzle 52 is coupled to the discharge end of discharge tube 50 and can change the flow rate of the outlet stream. If water flow rate regulation is not needed or desired, nozzle 52 may be replaced by a simple water dispersing strainer. If neither water flow regulation nor dispersion is desired, they may, of course, both be omitted.

The length of the horizontal intermediate portion 48 of discharge tube 38 is made longer than the distance between the swivel connection 40 and the outside of the longer container sides 24, 25 so that this discharge tube may be rotated, as shown in FIGS. 1 and 3, on its swivel between a first and second position. The first position is generally parallel to and between the longer container sides 24, 25, thereby to overlie the interior of the filter assembly. The second position is generally transverse to and extending beyond the longer container walls 24, 25, thereby to overlie the aquarium tank water in one transverse direction, or to reach outside of the aquarium tank in an opposite transverse direction. Thus, as shown in FIG. 2, with the pump energized and the discharge tube 38 in the first position parallel to and between sides 24, 25, water will be directed from the discharge tube into the filter assembly, while, as shown in FIG. 3., in the second position of the discharge tube 38 transverse to sides 24, 25, water will be directed from the discharge tube into the aquarium tank or alternatively outside of both the filter assembly and the aquarium tank.

The filtering element 18 may, as shown, be a filter bag with internal sponge, the bag being adapted to be coated with a fine particle filtering material. Filtering element 18 is removably attached to and supported by pump inlet 34 by being screwed or pressed onto the inlet 34 and constitutes the sole passage for fluid from the interior of the filter assembly 10 into the inlet 34. Other types of filtering elements may be substituted for filter element 18.

The pump motor 28 has two flanges 54, 56, best seen in FIGS. 1 and 3, oppositely extending horizontally from the top of the pump motor 28. These flanges 54, 56 fit within container 22 and are supported by corresponding ridges 58, 60 along the top of the longer sides 24, 25 of the filter assembly container 22. The weight of the motor assembly 14 is sufficient to more than counterbalance the rotational effect of the laterally extending fluid conduits 36 and 38 so that pump motor 28 may be positioned between these ridges 58, 60 adjacent one shorter side 27 of tank 22 without rocking, and need not be further secured to the tank side walls 24, 25. It will be appreciated that the entire combination of motor assembly 14, filtering element 18 and the fluid conduit means 16 may thus be easily installed within and removed from the filter assembly as an integral unit. Further fastening means may, however, be provided if so desired.

The flotation valve 20 is located at the bottom of tank 22 alongside filter element 18 and beneath the discharge end portion 50 of fluid discharge tube 38. This flotation valve 20 controls the entry of water into the filter assembly container 22 through a circular opening 64 in the bottom wall 66 of tank 22. The valve 20 includes a flotation ball 68 which moves vertically within and is guided by an open vertical cage 70 formed by two pairs of mutually perpendicular vertical strips 71, 72 and 73, 74 extending on opposite sides of the opening 64 between the bottom wall 66 and a cross-arm yoke 75 at the top of the valve 20.

Flotation ball 68 has a diameter somewhat larger than that of opening 64 and floats up and down within its cage depending upon the pressure of the water. Thus, when container 22 is initially inserted within a water-filled aquarium tank with the pump motor 28 turned off, the water from the aquarium tank will push upwardly on the ball 68 and ball 68 will float upward as the water enters filter assembly container 22 through opening 64 until the ball reaches the top yoke 75 of cage 70. The water from the aquarium tank will continue to enter container 22 until the water level within the filter assembly 22 is equal to that in the aquarium tank.

The upward force exerted on the flotation ball 68 within cage 70 will, of course, depend upon the size and weight of the ball 68 and can be set so the ball will move up upon the entry of the water.

When the end portion 50 of discharge tube 48 is rotated to the second position directing the discharge of water into the filter assembly, the downward force of the pump water emitted from the discharge tube 48 into the filter assembly 10 is such as to make the pressure in the filter assembly greater than in the aquarium tank so that ball 68 moves to the bottom of its cage 70 and seals off further entry of aquarium tank water into the filter assembly 10 through opening 64. By continuing to energize the pump motor 28 with the discharge end portion 50 of tube 48 internally directed within the filter assembly, no further water will enter the filter assembly and the contaminated water previously introduced into the filter assembly 10 from the aquarium tank is continuously recirculated within the filter assembly 10.

Figure 4A:
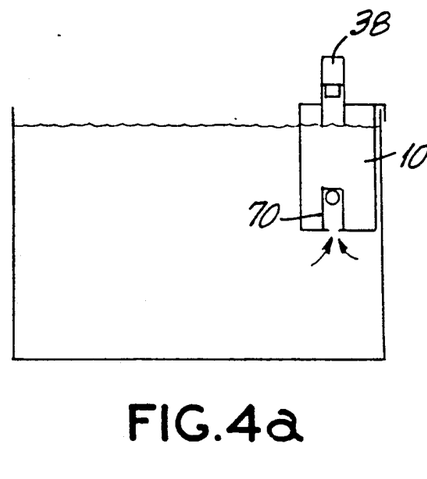
FIGS. 4a, 4b, 4c and 4d are schematic views showing different operating positions of the filter assembly within an aquarium tank to explain the operation of the filter assembly in accordance with a first embodiment.

Referring now to FIGS. 4a, 4b, 4c, and 4d, the various operating positions and conditions of the filter assembly 10 when mounted within an aquarium will now be described. In FIG. 4a, the condition of filter assembly 10 is shown when first mounted on a side wall internally of an aquarium tank with the pump motor 28 turned off. In this condition the ball 68 of the flotation valve 20 floats upwardly permitting the aquarium water to fill the filter assembly 10. The water must rise within the filter assembly so as to be above the impeller. This serves to prime the filter.

Figure 4B:
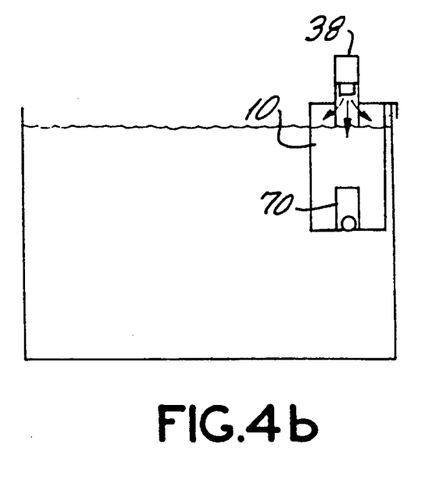

In FIG. 4b, the operating condition of the filter assembly 10 is shown in which the discharge tube 48 is in its first position to direct the discharge flow back into the filter assembly with the pump motor 28 turned on. In this condition, the ball 68 of the flotation valve 20 shuts off the entry of further aquarium tank water into the filter assembly 10, and the water is thus trapped and recirculated through the filter element 18 within the filter assembly 10. Fine particles of diatomaceous earth material can now be added directly into the filter. The continuously recirculating water in the filter container will cause a flow of water toward the filter bag. This will produce a coating on the surface of the filter bag of the diatomaceous earth particles. Accordingly, by putting the discharge tube in this first position to run the filter internally, the filter is self-priming in that the filter bag becomes self-coating. The completion of coating can be detected when the water in the filter container becomes clear, which indicates that all the filtering particles have coated the filter bag.

Figure 4C:
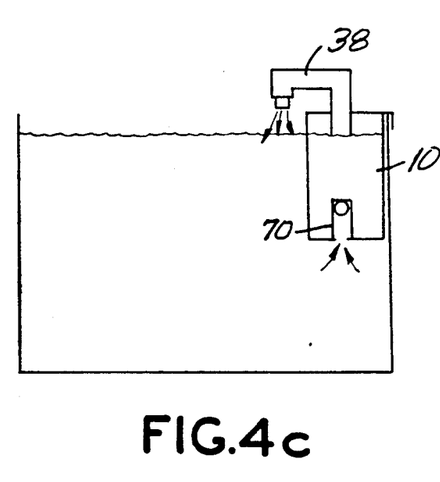

After the filter bag has been coated and the filter is thus primed, the operating condition of the filter assembly 10 is then begun. This condition is shown in FIG. 4c wherein the discharge tube 48 is placed in its second position to direct the discharge flow of water from the filter assembly 10 into the aquarium tank with the pump turned on. In this condition the ball 68 of the flotation valve 20 moves upward because the flow of the water out of the filter assembly reduces the pressure in the filter assembly. The water from the aquarium tank will enter the filter assembly through the valve, to bring the level of water in the filter assembly back to the level of the water in the aquarium tank. This results in a circulating of the water from the aquarium tank into the filter assembly, through the diatomaceous earth filter and back to the aquarium tank.

Figure 4D:
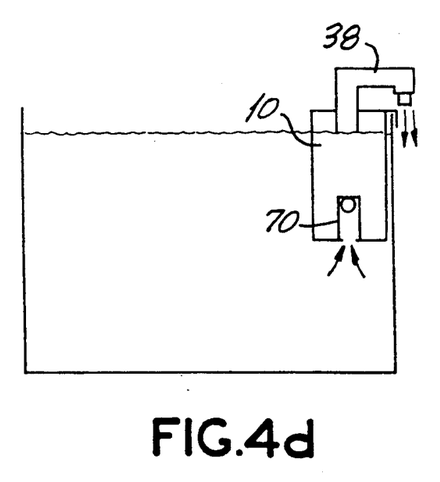

In FIG. 4d, the operating condition of the filter assembly 10 is shown in which the discharge tube 48 is in a position to direct the discharge flow of water from the filter assembly 10 to outside of both the filter assembly and the aquarium tank. This operating condition provides a convenient means for drainage of the aquarium tank to a lower water level or to replace the aquarium water.

In order to replace filtering element 18 with another filtering element, it is only necessary to lift the entire combination of motor assembly 14, filtering element 18 and fluid conduit means 16 as a unit out of the filter assembly container 22, replace the filtering element 18 with another filtering element, and then to again replace the entire combination back into position within the filter assembly 10 with the flanges 54, 56 of pump motor 28 resting within ridges 58, 60 along the top of tank 22.

When filtering element 18 is used, the sequence of operations is normally to mount the filter assembly 10 within the aquarium tank with the pump turned off. The pump motor 28 is then turned on with the discharge flow from outlet tube 38 directed within the filter assembly 10, thereby to seal off further entry of aquarium water into the filter assembly and to establish a recirculation of water through the filtering element within the filter assembly. Fine particle filtering material is then introduced into the filter assembly 10 to produce a coating of the filtering element 18. During this coating process, if a water flow regulating nozzle 52 is provided it may be adjusted to produce a fairly high rate of discharge flow to speed the self-priming process. When the coating of the filter bag is completed, the discharge tube 38 is rotated on its swivel to overlie the aquarium tank while the pump motor 28 remains on, thereby to establish a circulation of the aquarium water through the coated filtering element 18 to provide normal filtration of the aquarium tank water. At this time, the water flow regulating nozzle 52 can be adjusted to reduce the rate of output flow from discharge tube 38 and to provide a fine spray so as not to unduly disturb the fish within the aquarium tank and simultaneously to provide a high degree of aeration of the filtered water being returned to the aquarium. When filtration of the aquarium tank is completed, the discharge tube can again be swiveled to its first position to recirculate the water within the filter The motor is turned off and the entire filter removed. The valve will be closed during the removal to prevent any of the contaminated water from leaving the filter. Thus, the filter can be easily removed without any of the contaminated water flowing back into the now filtered tank.

If it should become necessary or desirable to lower the water level within the aquarium or to replace the water within the aquarium, the discharge tube 38 may be rotated on its swivel to a position directing the output flow out of the aquarium while the pump motor is turned on, thereby to drain the aquarium water.

Figure 5:
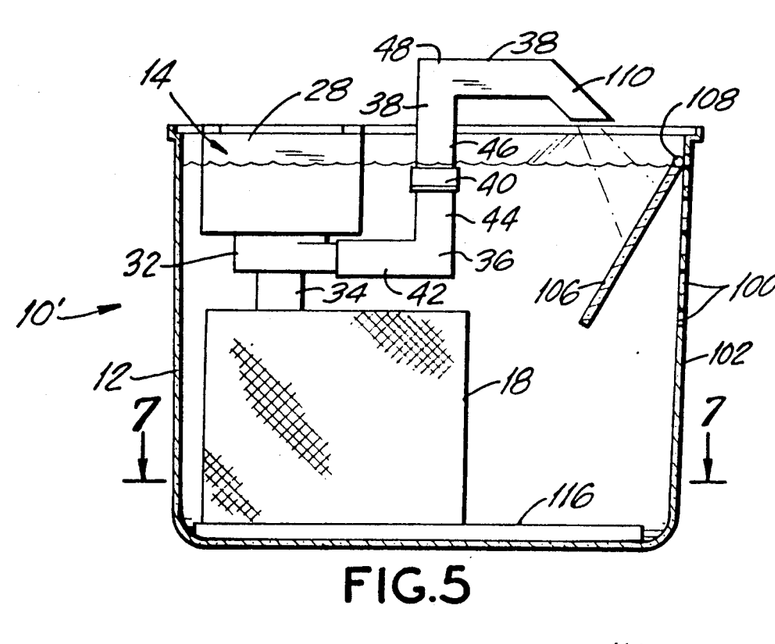
FIG. 5 is a front sectional view of the filter assembly in accordance with a second embodiment thereof.
Figure 6:
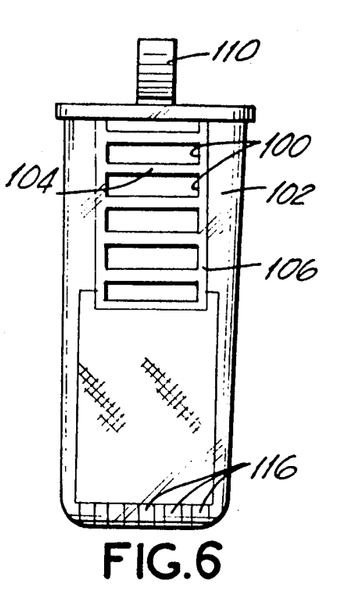
FIG. 6 is an end view of the filter assembly shown in FIG. 5.
Figure 7:
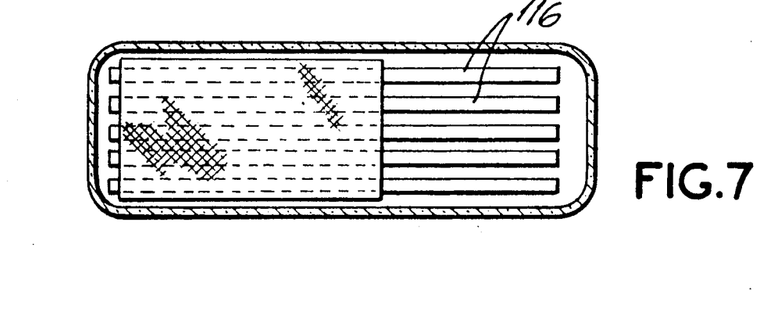
FIG. 7 is a cross sectional view taken along line 7—7 of FIG. 5.

Referring now to FIGS. 5-7, there is shown a second embodiment of the filter assembly wherein the flotation valve of the first embodiment is replaced by a flap valve. More specifically, with reference now to FIGS. 5 and 6, the filter assembly 10 is shown wherein those parts that are identical to the heretofore described parts of the first embodiment are identified with like numerals It will be noted, that the flotation valve with its cage has been eliminated. In its place, there is provided an opening 100 and end wall 102 of the housing. A series of bars 104 can be placed across the opening to provide a grill which prevents the entry of fish into the opening 100. Pivoted internally of the housing is a flap door 106 connected by means of a hinge pin 108 which can be integrally molded into the housing. The flap door 106 is free to swing internally of the filter housing.

The other change provided in the filter assembly of the second embodiment is that the discharge end 110 of the fluid conduit is angled so that water discharging from this discharge end will be directed toward the flap door 106.

The operation of the second embodiment can best be understood with reference to FIGS. 10a-10f. Referring to 10a, the filter assembly is initially inserted into the aquarium tank 112 with the pump motor turned off. Upon insertion into the aquarium tank, the water from the aquarium tank will force open the flap door 106 causing aquarium water to enter into the filter assembly. The water will fill the filter assembly to the same level as the water is positioned in the aquarium tank. This amount of water should be at least sufficient to cover the impeller to thereby prime the filter assembly.

Figure 10A:
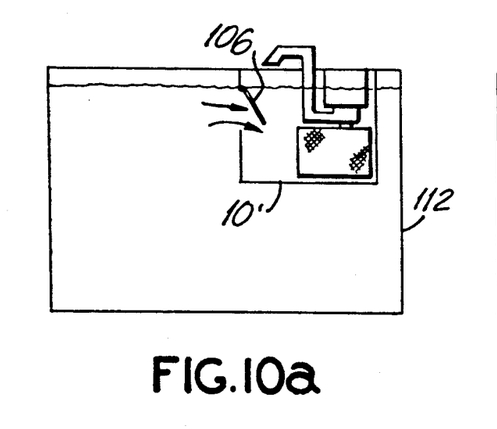
FIGS. 10a, 10b, 10c, 10d, 10e, and 10f are schematic views showing different operating positions of the filter assembly in connection with an aquarium tank in order to explain the operation of the filter assembly in accordance with a second embodiment.
Figure 10B:
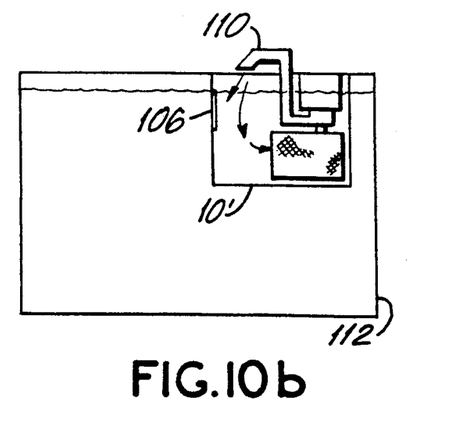

With reference to 10b, the pump motor is then turned on. The water discharging from the discharge end 110 forces the flap door 106 into a closed position thereby sealing further entry of water from the aquarium 112. As a result, water will circulate internally of the filter assembly 10. Diatomaceous earth can then be placed into the filter assembly and the internally circulating water will cause the filter to become charged with diatomaceous earth.

Figure 10C:
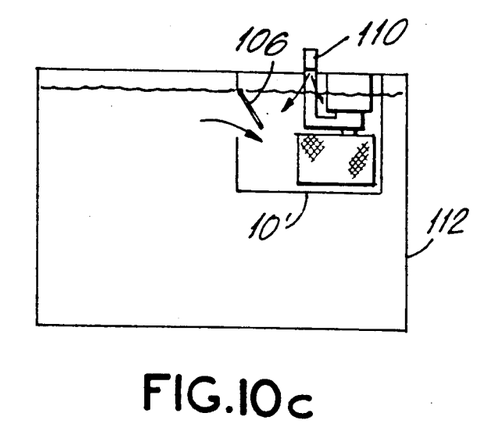
Figure 10D:
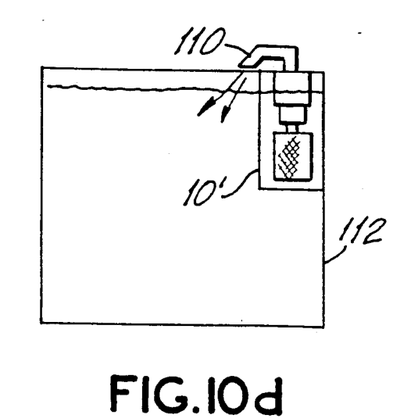

With reference to FIGS. 10c and 10d, the internal circulation of the water within the filter assembly is continued until the filter bag is completely coated. This can best be noted when the water within the filter assembly clears from the floating diatomaceous earth particles indicating that they have been completely coated onto the filter bag. At this point, with the motor still on, the fluid conduit is rotated so that it now discharges its water into the aquarium tank itself. As the water leaves the filter assembly, it causes the flap door 106 to be opened as additional water from the aquarium tank now flows into the filter assembly. This continues until there is adequate filtration completed within the aquarium tank.

Figure 10E:
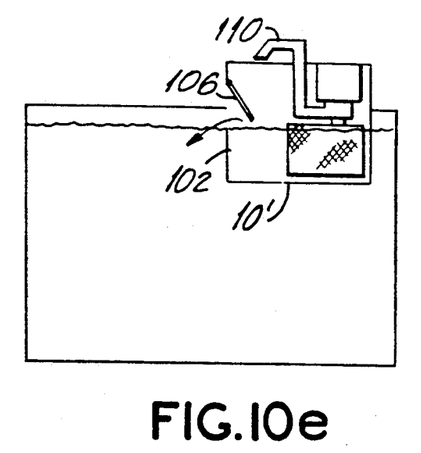
Figure 10F:
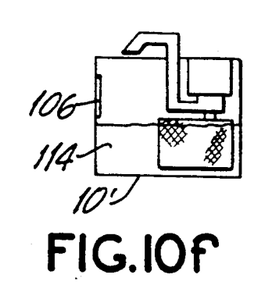

Upon completion of filtration, the discharge end is again turned internally towards the filter assembly itself. The pump motor is then turned off, as shown in FIG. 10e. The filter assembly can now be removed upwardly out of the aquarium tank. Normally, the flap door will remain closed during such removal. However, even if the flap door does open slightly, and permits some of the water from the filter assembly to leak out into the aquarium tank, the only amount of filter assembly water that will leak out will be that portion which is above the opening in the side wall 102. As a result, the bulk of the water will remain within the filter assembly. Thus, as shown in FIG. 10f, the filter assembly 10 can now be removed for disposal and the bulk of the water 114 below the flap door 106 remains in the filter assembly and can be poured out and disposed of.

The embodiment described in FIGS. 10a-10f utilizes a type of valve that does not have any seals or pressure rings, and thereby avoids the possibility of leakage. While the floating valve described in the first embodiment if not made accurately, there might be some leakage. By placing the opening in the side wall and using the flap door, it avoids the leakage possibility during removal of the filter assembly and thereby avoids any possibility of having all the diatomaceous earth fall into the aquarium tank during removal.

Referring back to FIGS. 5, 6, and 7, it will be noted that in the embodiment described there are also provided a series of upwardly projecting ribs 116 lying across the base of the filter housing. These ribs provide a support for the filter bag 18. This keeps the filter bag floating and prevents it from sagging onto the bottom wall of the filter housing. As a result, it permits water flow beneath the filter bag through the channels between the adjacent ribs.

Through the use of the ribs, it has been found that even if the filter bag clogs, it is possible to unplug the motor, shake the filter assembly so that the diatomaceous earth flakes off the filter bag, and then restart the motor again. The diatomaceous earth will then be recoated onto the filter bag and the process will start again. It has been found that this procedure can be repeated a number of times thereby getting more life out of the diatomaceous earth.

Figures 8, 9:
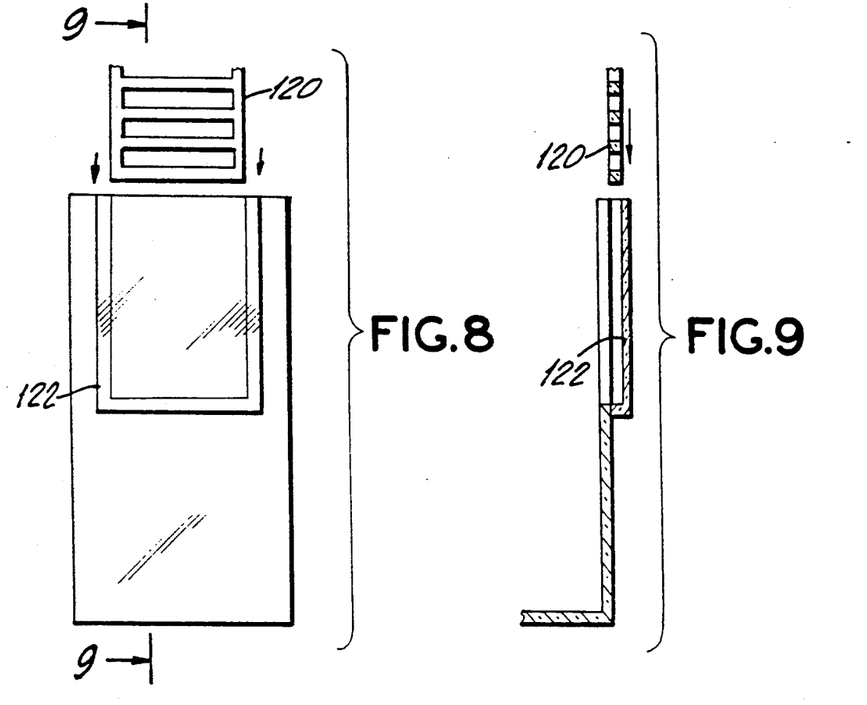
FIG. 8 is an exploded view showing the insertion of a replaceable filter strainer into the wall of the filter housing.
FIG. 9 is a cross sectional view taken along line 9—9 of FIG. 8.

Referring now to FIGS. 8 and 9, it will be noted that the strainer shown at 120 is a replaceable strainer that can be slid downwardly within a U-shaped channel 122 position on the side wall. In this way, the size of the bars on the strainer can be changed depending upon the size of the fish. Special small aperture strainers can be utilized for baby fish tanks in order to prevent the tiny fish from escaping into the filter assembly.

When the aforedescribed filter assembly is utilized only as a diatomaceous earth filter, or the like, it would be utilized only on an intermittent basis. Typically, such filters are utilized when severe filtering is required in the case of an aquarium tank water becoming cloudy, or such similar situations. After intermittent utilization, the entire filter assembly would be removed from the aquarium tank wall and the normal filtering equipment utilized for regular on-going filtering of the aquarium tank water.

It should also be appreciated, however, that the present described filtering assembly could actually also be used for regular filtration. By way of example, after being utilized as a diatomaceous earth filter, the motor can be stopped and the integral motor and filtering element removed from the filter housing. A standard type of filtering element can then be replaced on the nozzle of the motor. The motor unit can then be replaced with the standard filtering element and the motor turned on. This time the discharge tube would be turned as shown in FIG. 2 so that the discharge goes into the aquarium tank and normal filtration can occur through the standard filtering element.

While the invention has been described in connection with a particular embodiment thereof, many modifications may be made, and it is intended by the appended claims to cover all such modification as fall within the scope and spirit of the invention claimed.

We claim:

1. An aquarium filter assembly comprising a housing constructed to be mounted so as to depend into an aquarium tank;
    a filtering a element supported within said housing:
    pump means supported in said housing for circulating water through the filtering element;
    means for selectively directing water pumped through said filtering element to flow into said housing or into said aquarium tank, wherein said flow defines an output water flow
    an opening in said housing for receiving water from the aquarium tank, and
    valve means within said housing operable in response to the output water flow from the filtering element to shut off the entry of water into said housing through said opening when the output water flow is directed into said housing, thereby to provide recirculation of water through said filtering element and within said housing, and to permit entry of water into said housing through said opening when the output water flow is directed out of said housing into the aquarium tank, thereby to provide circulation of water through said filtering element back to the aquarium tank.

2. The aquarium filter assembly of claim 1, and further comprising fluid conduit means in flow communication with said filtering element, said directing means operating on said fluid conduit means.

3. The aquarium filter assembly of claim 2, wherein said fluid conduit means comprises a discharge tube movable between a first position directing the output water flow into said housing and a second position directing the output water flow into the aquarium tank.

4. The aquarium filter assembly of claim 3, wherein said housing comprises a container having an open top, and said discharge tube has an outlet end portion extending above the top of said outlet container.

5. The aquarium filter assembly of claim 4, wherein said directing means includes a swivel means coupled to said discharge tube, whereby said discharge tube is rotatable on said swivel means to move between said first and second positions.

6. The aquarium filter assembly of claim 5, wherein said container has a substantially rectangular cross-section with two opposing sides longer than its remaining two opposing sides, and said discharge tube has a horizontally extending portion longer than the distance between said swivel means and the outer surface cf at least one of said longer sides, thereby to reach beyond said one longer side in said second position.

7. The aquarium filter assembly of claim 5, wherein said discharge tube comprises interconnecting tube segments, one of said segments having a receiving collar, the other of said segments rotatably seating in said receiving collar.

8. The aquarium filter assembly of claim 3, wherein said fluid conduit means in said first portion directs the output water toward said valve means.

9. The aquarium filter assembly of claim 3, wherein the directing means permits said discharge tube to move to a third position for directing water to flow out of said fluid conduit means beyond both said housing and the aquarium.

10. The aquarium filter assembly of claim 9, wherein said housing comprises an open top container of rectangular cross-section having two opposing sides longer than its remaining two opposing sides, and said fluid conduit means has a swivel connection to said discharge tube, said discharge tube having an inlet portion connected to said swivel means, a horizontally extending intermediate portion and an outlet end portion, said intermediate portion and said outlet end portion being located above the top of said container and being shorter than the distance between said swivel means and one of said shorter sides and longer than the distance between said swivel and each of said longer sides, whereby said outlet tube may be rotated on said swivel to said first position generally parallel to said longer sides, and to said second position transverse to one of said longer sides.

11. The aquarium filter assembly of claim 2, further comprising means for regulating the rate of water flowing through said filtering element.

12. The aquarium filter assembly of claim 11, wherein said water flow regulating means comprises a nozzle attached to an output end of said fluid conduit means.

13. The aquarium filter assembly of claim 2, further comprising means for dispersing the water flowing out of an outlet end of said fluid conduit means to thereby provide aeration of the circulating water.

14. The aquarium filter assembly of claim 2, wherein said pump means, said fluid conduit means, and said filtering element form a unitary assembly which is removably supported within said housing.

15. The aquarium filter assembly of claim 14, wherein said housing comprises a container having an open top and two pairs of opposing sides, and said pump means comprises a motor having a pair of flanges extending horizontally therefrom in opposite directions to be supported on one pair of opposing sides.

16. The aquarium filter assembly of claim 14, wherein said fluid conduit means is removable from said pump means.

17. The aquarium filter assembly of claim 1, wherein said opening is in a side wall of said housing, and said valve means comprise a swingable flap door coupled to said housing for swinging into said housing to expose said opening and capable of swinging closed on to said opening.

18. The aquarium filter assembly of claim 1, wherein said opening is in a bottom of said housing, and said valve means comprises a floatation ball and a cage for containing said flotation ball, whereby said flotation ball moves within said cage for opening and closing said valve means.

19. The aquarium filter assembly of claim 1, wherein said filtering element is removably coupled to said pump means.

20. The aquarium filter assembly of claim 1, wherein said filtering element comprises a filter bag adapted to be coated with fine particle filtering material.

21. The aquarium filter assembly of claim 1, and further comprising means for supporting said housing on a side wall of the aquarium tank with an upper end of said housing projecting above the water level in the aquarium tank.

22. The aquarium filter assembly of claim 1, and further comprising a plurality of ribs upstanding from a bottom of the tank for supporting the filtering element in spaced relationship to the bottom of the housing thereby permitting circulation of water beneath the filtering element.

23. A method of filtering an aquarium tank utilizing an aquarium filter assembly in which a housing contains a water impeller pump from which depends a filtering element, means for selectively directing water pumped from the filtering element into the housing or back into the aquarium tank, and a valve means controlling flow through an opening in the housing to prevent entry of aquarium tank water into the housing when the output water flow is directed within the housing and to permit entry of water into the housing when the output water flow is directed back into the aquarium tank, the method comprising the steps of:
(a) inserting the housing into the aquarium tank with the pump means not energized to thereby permit entry of aquarium tank water through the opening to at least partially fill the housing above the impeller;
(b) directing the water flow from the filtering element into the housing;
(c) energizing the pump means whereby the valve will close so that the water will recirculate within the housing; and thereafter,
(d) directing the flow from the filtering element back into the aquarium tank whereby the valve means will now open permitting entry of aquarium tank water into the housing to thereby provide a filtering circulation of the aquarium tank water through the filter assembly.

24. The method as in claim 23, and further comprising the step of adding small particle filtering material into the water in the housing before the step of energizing, whereby during the recirculation of water within the housing the small particles will coat the filtering element.

25. The method as in claim 24, wherein said small particle filtering material is diatomaceous earth material.

* * * * *